March 19, 1935.  C. YARVISE  1,994,678
ARTIFICIAL BAIT
Filed Aug. 2, 1933
Fig. 1.
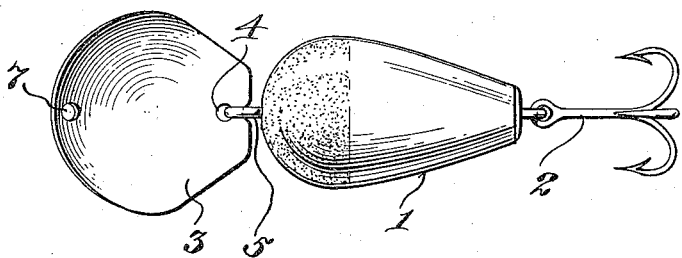
Fig. 2.
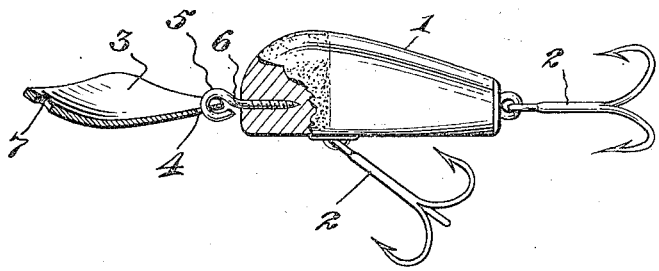
Fig. 3.
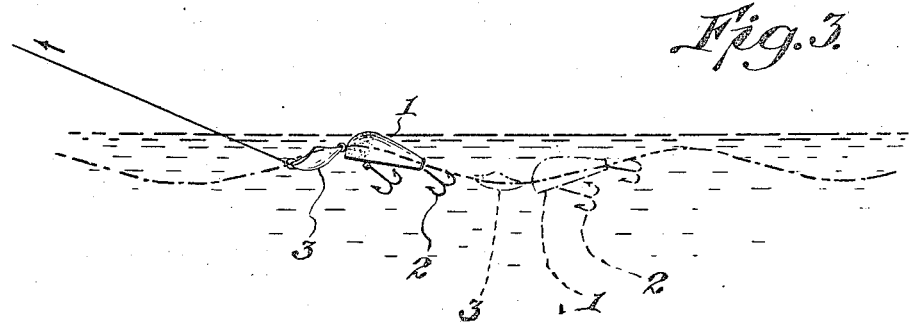
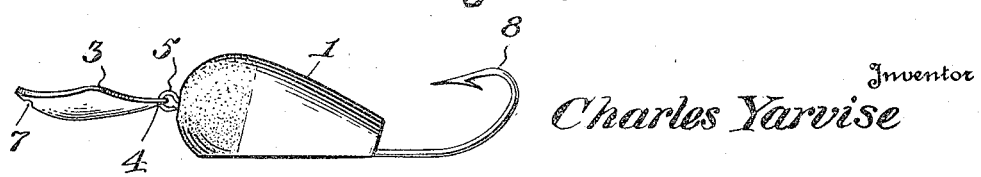
Fig. 4.
Inventor
Charles Yarvise
By Eccleston & Eccleston
Attorneys Patented Mar. 19, 1935

1,994,678

UNITED STATES PATENT OFFICE 1,994,678

ARTIFICIAL BAIT

Charles Yarvise, Gary, Ind., assignor to Creek Chub Bait Company, Garrett, Ind.

Application August 2, 1933, Serial No. 683,377

5 Claims. (Cl. 43—46)

This invention relates to artificial baits or lures and has for its primary object to provide a new type of lure which is highly attractive to fish and yet which is of a relatively simple and inexpensive construction.

Another object of the invention resides in the construction of a lure which is automatically caused to wiggle in a vertical plane as the lure is being retrieved, thereby effectively attracting the attention of the fish.

Other objects and advantages of the invention will be apparent from the following description when taken in connection with the accompanying drawing, in which, Figure 1 is a plan view of the new lure.

Figure 2 is a side elevational view thereof.

Figure 3 is a view of the lure in use, showing in exaggerated form the path of the lure in the water, and Figure 4 is a side elevational view of a slightly modified construction of lure.

Referring to the drawing in more detail, and especially to Figures 1 and 2, the numeral 1 designates the body portion of the lure provided with one or more gang hooks 2 of usual construction. The body 1 is shown as tapered toward its rear end and provided with a flat under surface. It is to be emphasized however that this particular shape is merely for the purpose of illustration and that the body may be constructed in many forms, it being essential only that it be buoyant in water, as will be referred to later.

At the forward end of the body 1 a concavo-convex plate 3 is provided. This plate 3 is preferably made of metal and is provided with an aperture 4 at its rear end for the reception of the eye 5 of screw 6 which is attached to the forward end of the body 1. The peripheral edge of the plate at its forward portion is substantially semi-circular in plan view, its rear edge being substantially straight and connected to the forward edge by diverging straight edges. The plate is provided with an aperture 7 in its front end for the attachment of a fish line thereto. It is to be understood of course that while as specific shape is given to the plate in the present disclosure such shape is not essential except as to the concavo-convex feature, the function of which will appear hereinafter. Also, while the plate is shown as somewhat thicker at its forward end than at its rear end such difference is not essential although desirable.

In the modified construction shown in Figure 4, a hook 8 is rigidly attached to the body 1 in lieu of the pivoted gang hooks 2; in all other respects the construction of this embodiment of the invention is identical with that shown in Figures 1 and 2.

Having fully described the structural details of two of the many forms of lures in which the present invention may be embodied I will now briefly describe the action of the lure when in use.

In the operation of either of these devices or similar constructions embodying a concavo-convex plate pivoted to the forward end of a buoyant body the lure will be caused to wiggle or follow an undulating course in a vertical plane as it is drawn through the water. By reason of the concavo-convex head piece there is a tendency for the lure to rise when being retrieved. The balance between the point of attachment of the line and of the body is such that this tendency is very slight however. The buoyancy of the wooden body portion 1 once the lure is under the surface of the water tends to destroy this balance and on account of the buoyancy lifts or sustains the rear end of the metal head piece 3. This action causes the lure to descend. The water pressure then becomes so great on the rear end of the head piece as to again destroy the balance of the lure and cause it to return to its initial or normal position, whereupon the buoyancy of the body 1 again destroys the balance and causes the lure to descend in the water. This cycle of operations is rapidly repeated so long as the lure is being drawn through the water and thus imparts a vertical wiggle to the lure which is highly successful in attracting the attention of the fish. Lures have been provided heretofore which are designed to wiggle and dart in a horizontal plane and some of such devices have been formed of pivoted sections; so far as is known however the prior art fails to disclose a lure which is so designed as to be capable of wiggling in a vertical plane and thereby emphasizing its presence to the fish.

From the above description and attached drawing it will be apparent to those skilled in the art that I have devised a bait construction which functions to cause the bait to wiggle in a vertical plane as it is drawn through the water; and that the essential construction may be embodied in a variety of forms of lures from the simple and inexpensive ones to the complex and more costly ones.

In accordance with the patent statutes I have described the preferred forms of the invention, but inasmuch as various changes may be made in the details of construction without departing from the spirit of the invention all such changes are intended to be included within the scope of the appended claims.

What I claim is:

1. A fish lure including a buoyant body portion and a longitudinally curved plate pivotally connected to the forward end of the body portion having its side edges of greater thickness at the forward end thereof than at the rear edge and with the curve thereof extending from the front and rear ends downwardly towards the bottom thereof.

2. A fish lure including a buoyant hook-supporting portion, and a longitudinally curved plate pivotally connected to the forward end of the hook-supporting portion, said plate being concavo-convex with the concave side thereof disposed upwardly to form a spoon or dish-shaped body and the forward portion thereof having greater thickness than the rear portion thereof.

3. A fish lure including a buoyant body portion, a longitudinally curved head piece of concavo-convex form, its peripheral edge at its forward portion being substantially semi-circular in plan view and its rear edge being substantially straight and connected to the front edge by diverging straight edges, said head piece being provided with an aperture in the front and rear ends thereof, attaching means secured to the buoyant body portion and pivoted in the rear aperture, the front aperture being adapted to serve as securing means for the attachment of a line.

4. A fish lure including a buoyant body portion, a longitudinal and transverse curved head piece pivoted to the forward end of the body portion, said head piece being of somewhat greater thickness at the front portion thereof than at the rear portion thereof and having an aperture at the front end thereof for the attachment of a line whereby the head piece will dip quickly when a pulling force on the line is suddenly released.

5. A fish lure including a buoyant body portion and a longitudinally curved plate pivotally connected to the forward end of the body portion with the curve of the plate extending from the front and rear ends downwardly towards the bottom thereof.

CHAS. YARVISE.